United States Patent [19]

Inui et al.

[11] Patent Number: 4,714,806
[45] Date of Patent: Dec. 22, 1987

[54] STEERING WHEEL WITH TAPE SWITCH ASSEMBLY

[75] Inventors: Shuji Inui, Nagoya; Yoshio Sano, Inazawa, both of Japan

[73] Assignee: Toyoda Gosei Co., Ltd., Nishikasugai, Japan

[21] Appl. No.: 928,646

[22] Filed: Nov. 5, 1986

Related U.S. Application Data

[63] Continuation of Ser. No. 697,448, Feb. 1, 1985, abandoned.

[30] Foreign Application Priority Data

Feb. 10, 1984 [JP] Japan .................... 59-018554[U]

[51] Int. Cl.⁴ ............................................. H01H 9/02
[52] U.S. Cl. ................................ 200/61.55; 200/86 R
[58] Field of Search ............... 200/61.54, 61.55, 61.56, 200/86 R; 339/35; 74/552

[56] References Cited

U.S. PATENT DOCUMENTS

| | | | |
|---|---|---|---|
| 2,770,696 | 11/1956 | Koenig | 200/86 R |
| 2,823,279 | 2/1958 | Schulenburg | 200/86 R |
| 2,938,977 | 5/1960 | Koenig | 200/86 R |
| 3,485,977 | 12/1969 | Goble | 200/86 R |
| 3,517,145 | 6/1970 | Wallace | 200/61.55 |
| 3,670,120 | 6/1972 | Corn et al. | 200/61.55 |
| 4,080,519 | 3/1978 | Michalson | 200/86 R |

FOREIGN PATENT DOCUMENTS

| | | |
|---|---|---|
| 2245376 | 1/1978 | Fed. Rep. of Germany . |
| 2740363 | 3/1979 | Fed. Rep. of Germany . |
| 322634 | 2/1983 | Fed. Rep. of Germany . |

Primary Examiner—A. D. Pellinen
Assistant Examiner—Morris Ginsburg
Attorney, Agent, or Firm—Cushman, Darby & Cushman

[57] ABSTRACT

A steering wheel structure having a plate switch on a pad portion thereof, wherein the plate switch comprises a plurality of tape-shaped switches arranged side by side and at least one terminal member having a plurality of terminals protrudingly spaced apart thereon. Either the upper surface or the lower surface of the terminal member is electrically conductive. Ends of the tape-shaped switches are respectively connected with the terminals. The tape-shaped switches respectively have a pair of electrodes spaced vis-a-vis.

3 Claims, 5 Drawing Figures

STEERING WHEEL WITH TAPE SWITCH ASSEMBLY

This is a continuation of application Ser. No. 697,448, filed Feb. 1, 1985, which was abandoned upon the filing hereof.

BACKGROUND OF THE INVENTION

1. Field of the Invention

This invention relates to an improved steering wheel structure, wherein a plate or membrane switch is provided a pad portion thereof.

A horn switch is generally provided on a pad portion in a steering wheel structure in a manner that the switch can be operated by a push over a wide area on the pad portion so that a horn can be sounded easily in case of emergency.

2. Description of the Prior Art

In a conventional steering wheel structure, the portion between a pad and a pad cover is so made as to move mechanically in order to connect a horn switch by a push on the pad cover.

Further, a steering wheel structure, having a plate switch on the pad portion, has been developed to enable the connection of the horn switch by a push over a wide area on the pad cover. The plate switch employed in a conventional steering wheel structure, however, has such problems as a difficulty and a high cost of manufacturing.

SUMMARY OF THE INVENTION

An object of this invention is, therefore, to provide a low-cost steering wheel structure, wherein a plate switch is provided on the pad portion and the size of the plate membrane type switch can be easily adjusted to as desired.

A steering wheel structure of this invention is characterized by a plate switch provided on the pad portion thereof. The plate switch comprises a plurality of tape-shaped switches arranged side by side and at least one terminal member having a plurality of terminals protrudingly spaced apart thereon. Either the upper surface or the lower surface of the terminal member is positive or negative. The ends of the tape-shaped switches are respectively connected with the terminals. The tape-shaped switches respectively have a pair of electrodes spaced vis-a-vis.

A steering wheel structure generally comprises a boss held by a steering shaft, a rim to be operated by a driver, spokes extending between the boss and the rim, and a pad portion provided above the boss. A conventional steering wheel or a steering wheel to be developed in the future may be employed as a steering wheel of this invention.

The plate switch characteristic of this invention is provided on the pad portion. The plate switch comprises a plurality of tape-shaped switches arranged side by side, thus covering a wide area. The tape-shaped switch mentioned above means a switch having two tape-shaped electrodes spaced vis-a-vis. It means more particularly such a switch as illustrated in FIG. 1 which comprises electrodes 1 and 2 having a relatively high rigidity and elastic spacers 3 and 4 provided between ends of the electrodes, or such a switch, a sectional view of which is shown in FIG. 2, comprising a substrate 5 made of a flexible sheet such as a plastic sheet so that the inner surface thereof can be spaced vis-a-vis by means of a bent portion 5a thereof and a spacer 6, and a pair of sputtered metal surfaces or metal foil attached on the opposing inner surfaces of the substrate 5 to make a pair of electrodes 7 and 8.

These tape-shaped switches are cut to appropriate length and arranged closely adjacent side by side to adjust the number and length thereof for a required size of the plate switch. In order to simplify the wiring of a plurality of the tape-shaped switches, it is preferable to employ a terminal member having a plurality of terminals on a side thereof. Either the upper surface or the lower surface of the terminals are electrically conductive. The terminals protruding from a side of the terminal member are inserted into the apertures between the electrodes of the tape-shaped switches. The upper and lower surfaces of each terminal are attached to corresponding electrodes of the tape-shaped switches to be electrically connected.

The plate switch may be secured to the pad portion by means of a adhesive double coated tape.

In addition, it is preferable to cover the plate switch with a soft layer made of such material as soft urethane foam and a surface cover made of a synthetic leather.

The steering wheel structure characteristic of this invention is provided with a plate switch on a pad portion thereof. The plate switch comprises a plurality of tape-shaped switches each having a pair of tape-shaped electrodes spaced vis-a-vis.

The size of the plate switch can be easily adjusted to as desired by changing the number and length of the tape-shaped switches. The plate switch is made wide by means of the tape-shaped switches arranged closely adjacent side by side.

An advantage of this invention is that the steering wheel structure can be made at a relatively low cost because of the simple structure of the plate switch comprising a plurality of tape-shaped switches arranged side by side on the pad portion thereof.

Another advantage of this invention is that the plate switch has a high dependability due to the tape-shaped switches utilized therefor.

BRIEF DESCRIPTION OF THE DRAWINGS

The foregoing objects and advantages and other more specific objects will be evident when proceeding through the following detailed description of an illustrated embodiment of the invention, particularly when considered in connection with the accompanying drawings in which.

DESCRIPTION OF THE PREFERRED EMBODIMENT

Figure 3:
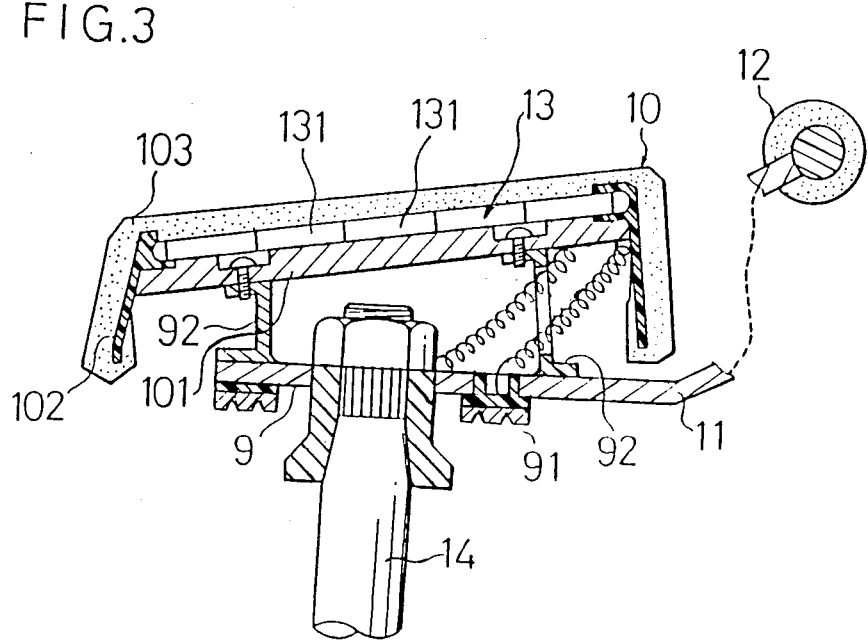
FIG. 3 is a view, mainly sectional, of principal portions of the steering wheel structure of this invention.

Referring now to the drawings, in which like reference numerals designate identical or corresponding parts throughout the several views, and more particularly to FIG. 3, wherein the steering wheel structure comprises a steering shaft 14, a boss 9 secured at the upper end portion of the steering shaft 14, a pad portion 10 held above the boss 9, a spoke 11 extended from the boss 9, a rim 12 connected with the end of the spoke 11 opposite to the one extended to the boss 9, and a plate switch 13 secured on the pad portion 10.

A slip ring 91 is provided on the bottom side of the boss 9 to be electrically connected with the automobile battery via a contact terminal member provided on the upper end of a steering column (not shown). One contact of the plate switch 13 is electrically connected to the ring 91 and the other contact is grounded. The pad portion 10 comprises a base plate 101 secured above the boss 9 by means of supports 92, the plate switch 13 secured on the top side of the base plate 101, a surrounding member 102 of a frame shape, for securing the perimeter of the plate switch 13, and a covering member 103, of urethane foam rubber for covering the plate switch 13 and the surrounding member 102.

Figure 1:
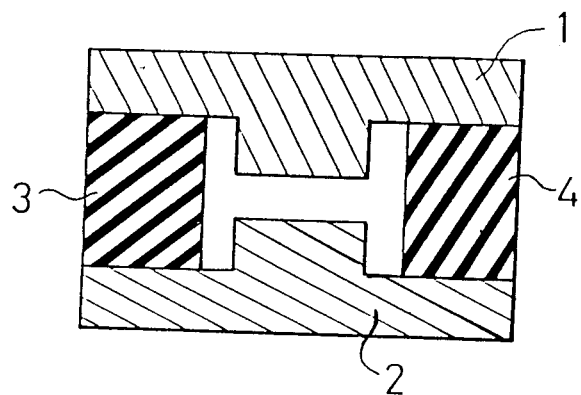
FIG. 1 is a sectional view of a tape-shaped switch which may be employed in the steering wheel structure of this invention.
Figure 2:
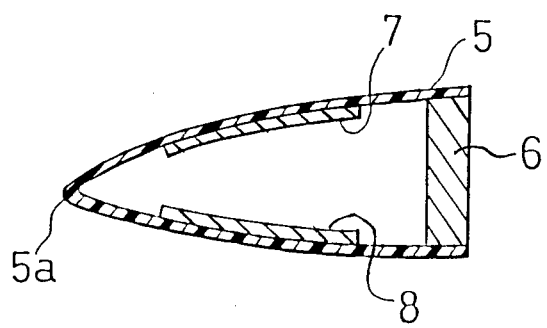
FIG. 2 is a sectional view of another tape-shaped switch which may be employed in the steering wheel structure of this invention.
Figure 4:
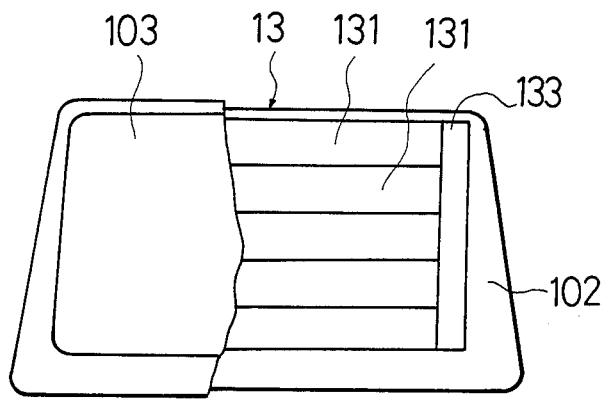
FIG. 4 is a plan view of the plate switch employed in the steering wheel structure of this invention with a part broken away to reveal the tape-shaped switches.

The plate switch 13 comprises five tape-shaped switches 131 arranged side by side as illustrated in FIG. 4. The tape-shaped switch 131 comprises metal electrodes 1 and 2, of which T-shaped cross sections are shown in the FIG. 1, and spacers 3 and 4 provided between the electrodes 1 and 2.

Figure 5:
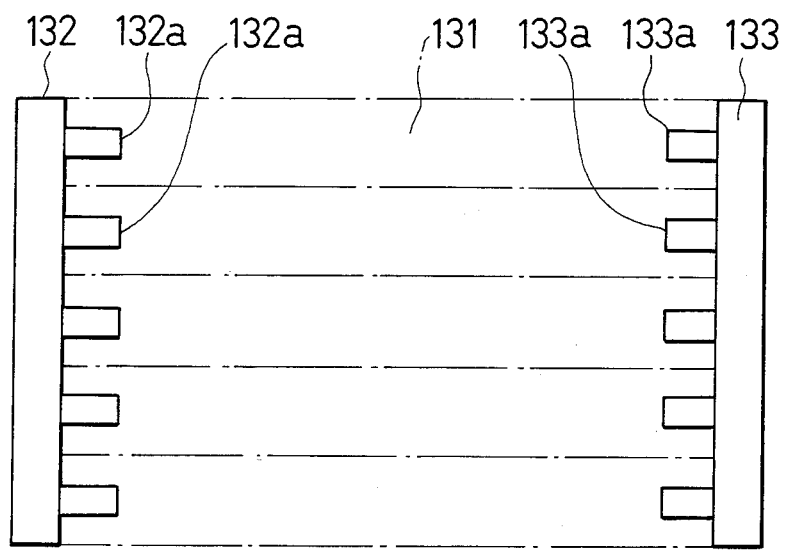
FIG. 5 is a plan view of the tape-shaped switches employed in the plate switch.

As shown in FIGS. 4 and 5, first and second generally flat terminal members 132 and 133 are provided with a plurality of terminals 132a and 133a of which cross sections correspond to apertures formed at the ends of the tape-shaped switches 131.

The terminals 132a and 133a are electrically conductive only on one surface thereof. The terminals 132a are conductive on the upper surface. The terminals 133a are conductive on the lower surface.

The horn switch of the steering wheel structure of the present invention is operated by a push on the upper surface of the pad portion 10. The push depresses the tape-shaped switches and the spacers located in the push area, thereby connecting the upper electrodes with the lower electrodes.

The steering wheel structure of this invention can be made at a relatively low cost.

The plate switch of the steering wheel structure is made durable due to a simple structure thereof utilizing the tape-shaped switches.

The size of the plate switch of the steering wheel structure of this invention can be easily adjusted as desired by changing the number and length of the tape-shaped switches.

Obviously, many modifications and variations of the present invention are possible in the light of the above teachings. It is therefore to be understood that within the scope of the appended claims, the invention may be practiced otherwise than as specifically described.

What is claimed is:

1. A steering wheel structure having a pad portion comprising:
   a hard base plate;
   a plate switch disposed on and overlying substantially the entire area of said plate and comprising a plurality of tape-shaped switches arranged closely adjacent side-by-side, each of said tape-shaped switches being generally in the shape of an elongated tape, of greater length than width, and comprising a pair of opposed electrodes each of T-shaped section extending the full length of the tape and sandwiched between insulating elastic tape-like backing strips and means for maintaining said electrodes normally spaced apart but capable of being urged into contact at any portion along the length thereof by localized pressure on a backing strip, said means including an elastic spacer between said electrodes of each pair; and
   a soft covering member disposed over and covering said plate switch, whereby said plate switch extends over a large area of said pad portion and is operable by a push on substantially any portion of said pad portion area.

2. A steering wheel structure having a pad portion comprising:
   a hard base plate;
   a plate switch disposed on and overlying substantially the entire area of said plate and comprising a plurality of tape-shaped switches arranged closely adjacent side-by-side, each of said tape-shaped switches being generally in the shape of an elongated tape, of greater length than width, and comprising a flexible substrate of C-shaped section, a spacer between the ends of said substrate, a pair of opposed electrodes extending the full length and fixed to the inner surface of said substrate, and means including said spacer for maintaining said electrodes normally spaced apart but capable of being urged into contact at any portion along the length thereof by localized pressure on a backing strip; and
   a soft covering member disposed over and covering said plate switch, whereby said plate switch extends over a large area of said pad portion and is operable by a push on substantially any portion of said pad portion area.

3. A steering wheel structure having a pad portion comprising:
   a hard base plate;
   a plate switch disposed on and overlying substantially the entire area of said plate and comprising a plurality of tape-shaped switches arranged closely adjacent side-by-side and each having a pair of opposed spaced electrodes;
   at least one terminal member spanning said tape-shaped switches at one end thereof and having corresponding protruding terminals each connected to one of the electrodes of the corresponding tape-shaped switch;
   each of said terminals extending between and contacting both electrodes of the corresponding tape-shaped switch and only that side of the terminal contacting one of said electrodes being electrically conductive; and
   a soft covering member disposed over and covering said plate switch and terminal member, whereby said plate switch extends over a large area of said pad portion and is operable by a push on substantially any portion of said portion area.

* * * * *